(12) United States Patent  
Castillo

(10) Patent No.: US 8,398,137 B2
(45) Date of Patent: Mar. 19, 2013

(54) AUXILIARY BED FLOOR FOR SHEET MATERIALS

(75) Inventor: Brian V. Castillo, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 200 days.

(21) Appl. No.: 12/979,155

(22) Filed: Dec. 27, 2010

(65) Prior Publication Data

US 2012/0161470 A1 Jun. 28, 2012

(51) Int. Cl.
*B62D 33/02* (2006.01)

(52) U.S. Cl. ............... 296/26.07; 296/183.1; 296/37.6; 296/100.08

(58) Field of Classification Search ............... 296/24.44, 296/26.06, 26.07, 183.1, 37.6, 39.2, 25, 18, 296/100.08; 414/495
See application file for complete search history.

(56) References Cited

U.S. PATENT DOCUMENTS

| 4,394,100 | A | * | 7/1983 | Sperlich | 410/2 |
| 4,898,284 | A | * | 2/1990 | Arens | 211/162 |
| 5,314,200 | A | * | 5/1994 | Phillips | 280/400 |
| 5,328,320 | A | * | 7/1994 | Farrow et al. | 414/495 |
| 5,536,131 | A | * | 7/1996 | Behr | 414/495 |
| 5,927,783 | A | * | 7/1999 | Baka | 296/37.6 |
| 6,227,592 | B1 | * | 5/2001 | Thacker | 296/26.07 |
| 6,283,526 | B1 | * | 9/2001 | Keough et al. | 296/26.09 |
| 6,447,237 | B1 | * | 9/2002 | Haynes | 414/483 |
| 6,644,704 | B1 | * | 11/2003 | Nyberg | 296/3 |
| 6,666,490 | B1 | * | 12/2003 | Thacker | 296/26.07 |
| 6,758,648 | B1 | * | 7/2004 | Eekhoff et al. | 414/495 |
| 6,789,829 | B1 | * | 9/2004 | Kapels | 296/11 |
| 6,921,120 | B1 | * | 7/2005 | Ervin | 296/26.02 |
| 6,932,401 | B1 | * | 8/2005 | Eekhoff et al. | 296/16 |
| 7,014,237 | B1 | * | 3/2006 | Eekhoff et al. | 296/16 |
| 7,243,965 | B2 | * | 7/2007 | King et al. | 296/26.07 |
| 7,854,458 | B2 | * | 12/2010 | Hobrecht et al. | 296/26.07 |
| 8,182,020 | B2 | * | 5/2012 | Herndon | 296/100.06 |
| 2007/0257507 | A1 | * | 11/2007 | Hobrecht | 296/100.08 |
| 2008/0265603 | A1 | * | 10/2008 | Bluhm | 296/37.6 |
| 2010/0308617 | A1 | * | 12/2010 | Golden | 296/39.2 |
| 2011/0074175 | A1 | * | 3/2011 | Mahaffy | 296/37.6 |
| 2011/0115250 | A1 | * | 5/2011 | Hobrecht et al. | 296/136.03 |

* cited by examiner

Primary Examiner — Jason S Morrow

(57) ABSTRACT

An auxiliary bed floor for a vehicle includes a panel that fits between the sidewalls of the vehicle and has cutouts along the side edges to remove portions of the panel that cannot fit between the wheel housings. The panel is mounted on the sidewalls by a plurality of swing arms, each having a first end pivoted on a sidewall above the floor, and a second end pivoted on the panel so that swinging of the swing arms will swing the panel between a lowered position in which the panel is adjacent the floor and a raised position in which the panel is positioned above the height of the wheel housings. A latch mechanism is provided to retain the panel at its raised position so that cargo can be carried on top of the panel as well as on the vehicle bed floor beneath the panel.

20 Claims, 3 Drawing Sheets

AUXILIARY BED FLOOR FOR SHEET MATERIALS

FIELD OF THE INVENTION

The present invention relates to the transport of sheet materials such as drywall in a motor vehicle and more particularly provides an auxiliary bed floor panel that will swing upwardly to a raised position above the vehicle wheel housings to permit carrying large sheet materials.

BACKGROUND OF THE INVENTION

It is known that pickup trucks have a cargo box mounted on the vehicle rearward of the cab. This box consists of a floor, sidewalls, a front wall, and a pivoting tailgate. The typical truck bed's width spans more than four feet but each of the sidewalls has a wheel housing that projects inward from the sidewalls, thereby reducing the width of the useful floor space. Sport-utility vehicles are similarly constructed, including a floor, sidewalls, and wheel housings that project inward from the sidewalls.

Vehicles such as pickup trucks and sport utility vehicles are often used to carry construction materials such as sheets of drywall or plywood. In some cases these sheet materials cannot be laid flat on the vehicle floor because the size of the sheet material exceeds the dimension between the wheel housings. Thus sheet materials must be tilted at an angle, and then the edge of the sheet material is susceptible to damage as it rides against the wheel housing.

It would be desirable to provide a convenient mechanism by which large size sheet materials could be carried in a horizontal position rather than a tilted position engaging against the wheel housing. It would also be desirable to provide a convenient mechanism by which a two-tier storage system could be created for carrying a cargo of tools and construction materials.

SUMMARY OF THE INVENTION

An auxiliary bed floor for a vehicle includes a panel that fits between the sidewalls of the vehicle and has cutouts along the side edges to remove portions of the panel that would interfere with the wheel housings. The panel is mounted on the sidewalls by a plurality of swing arms, each having a first end pivoted on a sidewall above the floor, and a second end pivoted on the panel so that swinging of the swing arms will swing the panel between a lowered position in which the panel is adjacent the floor and a raised position in which the panel is positioned above the height of the wheel housings. A latch mechanism is provided to retain the panel at its raised position so that cargo can be carried on top of the panel as well as on the vehicle floor beneath the panel.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

DETAILED DESCRIPTION OF THE EXEMPLARY EMBODIMENTS

Figure 1:
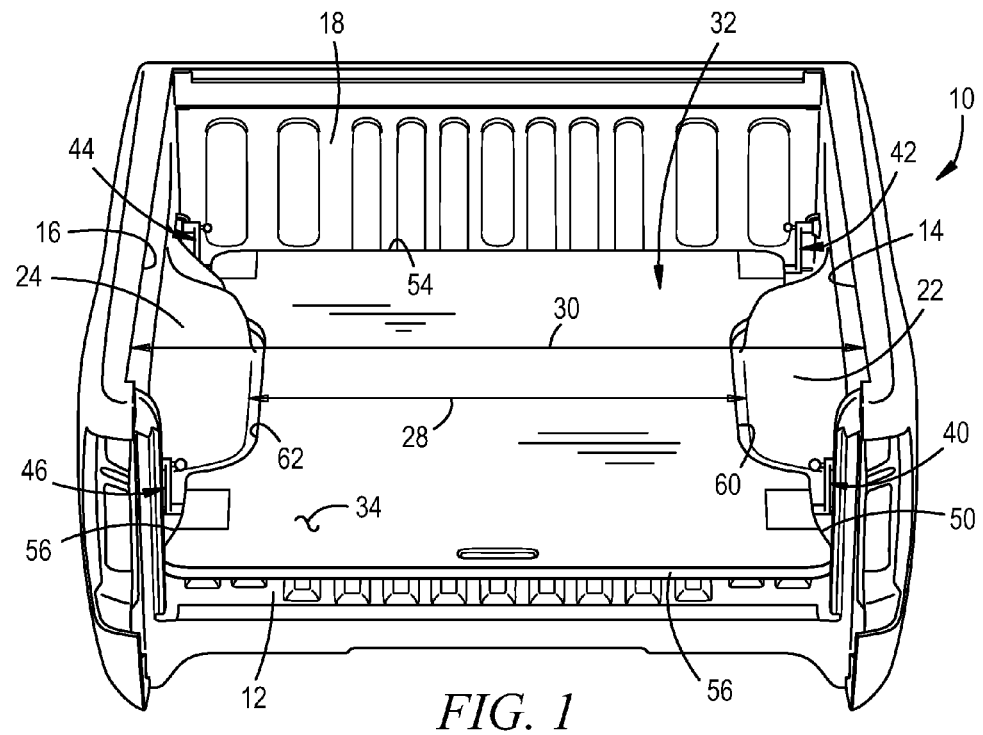
FIG. 1 is a perspective view of a pickup truck cargo box having an auxiliary or re-bed floor according to the invention and showing the auxiliary bed floor panel in a lowered position when not in use.

FIG. 1 shows a pickup truck cargo box, generally indicated at 10, that includes a floor 12, right sidewall 14, left sidewall 16, and a front wall 18. The rear end of the pickup box 10 is closed by a pivoting tailgate, not shown in the drawings. In FIG. 1, the vehicle wheels are concealed beneath a right-hand wheel housing 22 and a left-hand wheel housing 24. The wheel housings 22 and 24 project inwardly from the sidewalls 14 and 16 and rise vertically from the floor 12. Accordingly, as seen in FIG. 1, the distance between the wheel housings 22 and 24, as designated 28, is less than the distance between the sidewalls 14 and 16, designated 30. The distance 30 between the sidewalls 14 and 16 is typically greater than four feet, while the spacing between the wheel housings 22 and 24 can be, in some cases, less than four feet. Because the distance between the wheel housings 22 and 24 is less the distance between the sidewalls 14 and 16, oversize sheets of sheet materials cannot be laid flat upon the floor 12. Accordingly, if an oversized sheet of drywall, plywood, or other sheet material is to be carried in the pickup truck box 10, the sheet material will have to either rest on top of the wheel housings 22 and 24, or the sheet material will have to be tilted on edge so that one edge fits against the base of one of the wheel housings and the other edge rests on either the top of the other wheel housing or sidewall.

Figure 2:
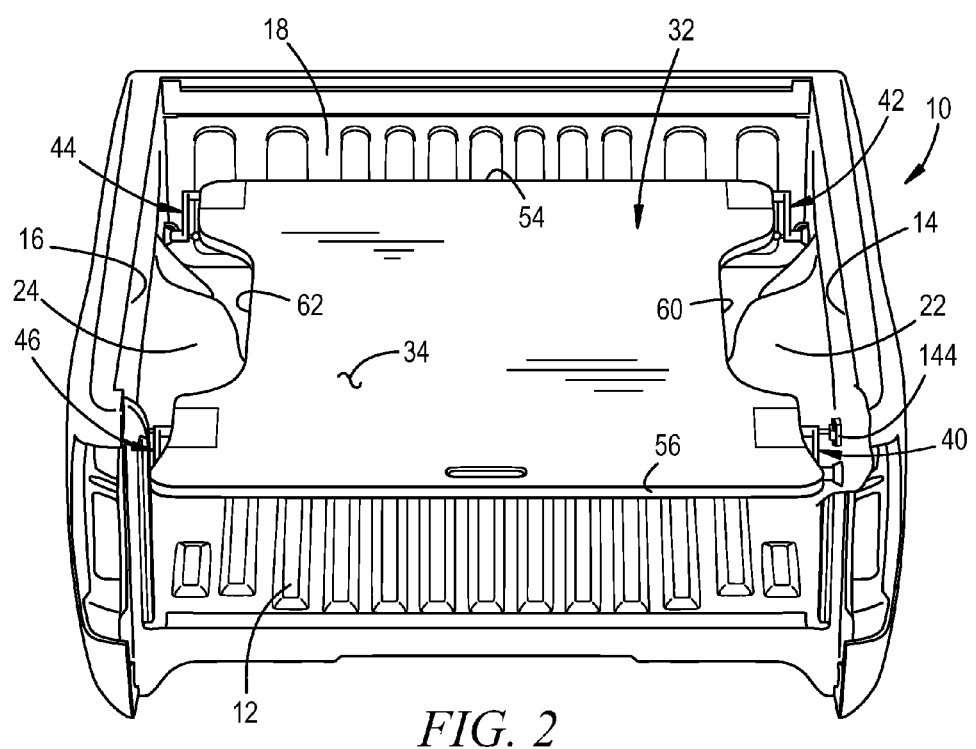
FIG. 2 is a view similar to FIG. 1 but showing the auxiliary bed floor panel having been swung to a raised position above the height of the wheel housings.

FIGS. 1 and 2 show an auxiliary bed floor assembly, generally indicated at 32, which includes a panel 34 that is movably mounted on the cargo box 10 by swing arm assemblies 40, 42, 44, and 46 provided at the four corners of the panel 34. The swing arm assemblies, generally indicated at 40, 42, 44 and 46 mount the panel 34 for movement between a lowered position shown in FIG. 1 in which the panel 34 rests adjacent the floor 12, and a raised position shown in FIG. 2 in which the panel 34 is positioned above the height of the wheel housings 22 and 24. In the raised position of FIG. 2, sheet material can rest flat on the panel 34 between sidewalls 14 and 16 just above the height of the wheel housings 22 and 24. In addition, as seen in FIG. 2 the space beneath the panel 34 can be used for carrying tools or other materials that will rest upon the floor 12. In addition, if the vehicle is equipped with a locking tailgate the panel 34 and the tailgate will cooperate to prevent theft of the tools or other materials that are hidden beneath the panel 34.

Panel 34 is generally rectangular in shape and includes a right side edge 50, left side edge 52, front edge 54 and rear edge 56. The right side edge 50 has a cutout 60 to fit around the wheel housing 22. The left side edge 52 has a cutout 62, to fit around the wheel housing 24. These cutouts 60 and 62 are large enough that the panel 34 can swing between the lowered position of FIG. 1 and the raised position of FIG. 2 without interference from the wheel housings 22 and 24.

Figures 3, 4:
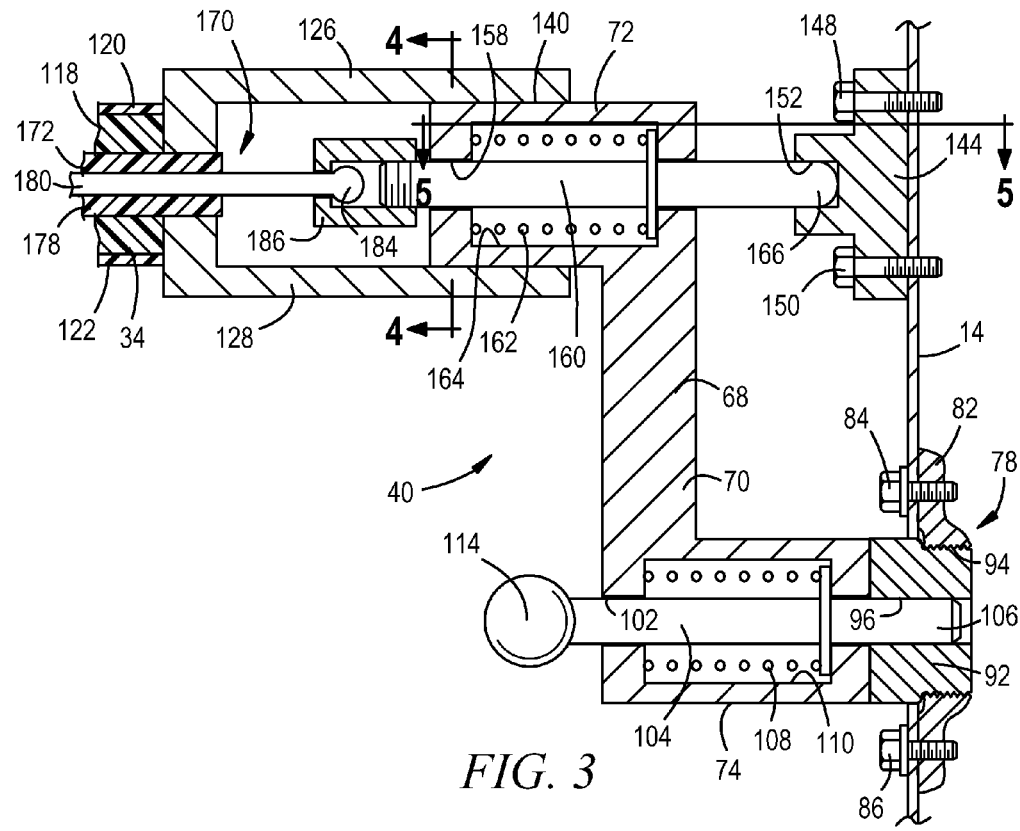
FIG. 3 is a view taken through one of the swing arm assemblies that mount the auxiliary bed floor panel on the vehicle, and having parts broken away and in section.
FIG. 4 is a section view taken in the direction of arrows 4-4 of FIG. 3.

Referring to FIG. 3, the right rear swing arm assembly 40 is shown in detail. The swing arm assembly 40 includes a swing arm 68 having a vertical arm 70 with a pivot hub 74 at a first end of the vertical arm 70 and a latch hub 72 at a second end of the vertical arm 70. The pivot hub 74 is pivotally mounted on the sidewall 14 of the cargo box 10, as will be discussed in detail hereinafter. The latch hub 72 is pivotally mounted on the panel 34 as will be discussed in detail hereinafter.

As seen in FIG. 3, a retainer assembly generally indicated at 78 includes a housing 82 attached to the bed wall 14 by bolts 84 and 86. A bushing 92 is threaded into the housing 82 by threads 94. The bushing 92 has a bore 96. The pivot hub 74 of the swing arm 68 has a bore 102 in which a pivot pin 104 is slidably mounted. End 106 of pivot pin 104 extends into the bore 96 of the retainer assembly 78. The pivot pin 104 is spring-loaded to its position of FIG. 3 by a coil compression spring 108 housed in a spring cavity 110 of the pivot hub 74. Accordingly, the pivot pin 104 will establish an axis of rotation 04 of the swing arm 68 relative to the sidewall 14 and the retainer assembly 78 mounted thereon. A knob 114 is provided on the end of the pivot pin 104 so that the vehicle user can retract the pivot pin 104 leftwardly against the spring load of the spring 108 to disengage the end 106 of pivot pin 104 from the retainer assembly 78. By retracting the pivot pin 104, the vehicle user can remove the panel 34 and the swing arm assembly 40 from the vehicle when the auxiliary bed floor apparatus 32 is not needed for hauling sheet materials.

Referring to FIGS. 3 and 4, it is seen that the panel 34 is of light weight construction including a core 118 of light weight stiff foam that is sandwiched between an upper sheet 120 and a lower sheet 122. The upper and lower sheets 120 and 122 are preferably high-impact plastic type material which protects and stiffens the core 118. If needed, stiffening ribs can be molded into the upper or lower sheets 120 or 122. Although this construction of foam and upper and lower plastic skins, as shown in FIG. 4, is preferred for its light weight, it will be appreciated that the panel 34 could be constructed of wood, metal, reinforced fiber, or other materials.

As seen in FIGS. 3 and 4, the latch hub 72 of the swing arm assembly 40 is pivotally mounted on the panel 34 by an upper mounting plate 126 and a lower mounting plate 128. A plurality of bolt assemblies 130 extend through the panel 34 to mount the upper mounting plate 126 and the lower mounting plate 128 on the panel 34. As best seen in FIG. 4, the upper mounting plate 126 has an upper bearing half 134 and the lower mounting bracket has a lower bearing half 136 that cooperate to capture an outer surface 140 of the latch hub 72. Accordingly, with the latch hub 92 pivotally mounted on the panel 34, the panel 34 is mounted on the cargo box 10 for swinging movement between the lowered position of FIG. 1 and the raised position of FIGS. 2 and 3.

Figure 5:
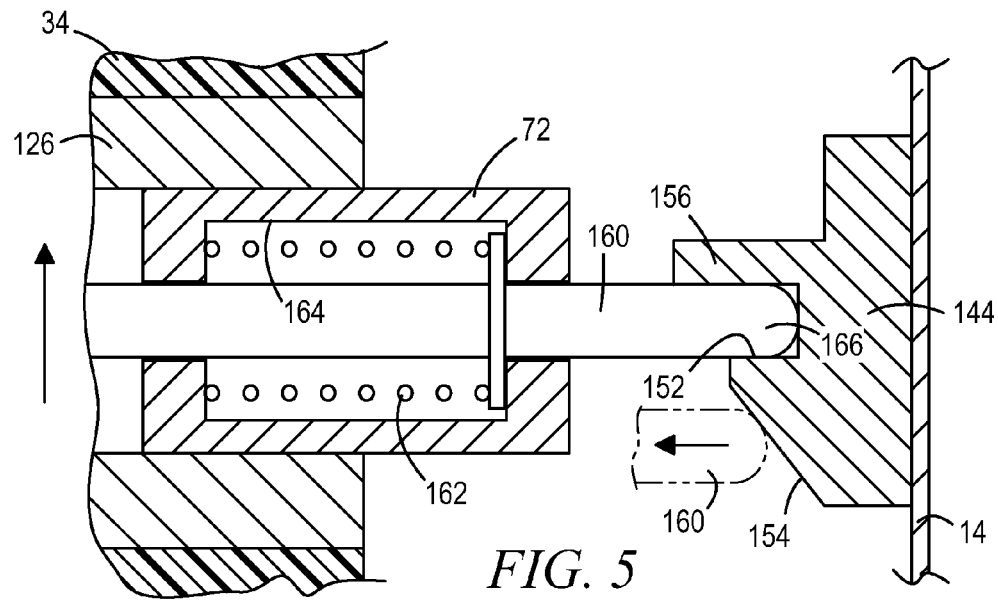
FIG. 5 is a section view taken in the direction of arrows 5-5 of FIG. 3 and showing a striker mounted on the vehicle sidewall for receiving a latch pin
Figure 6:
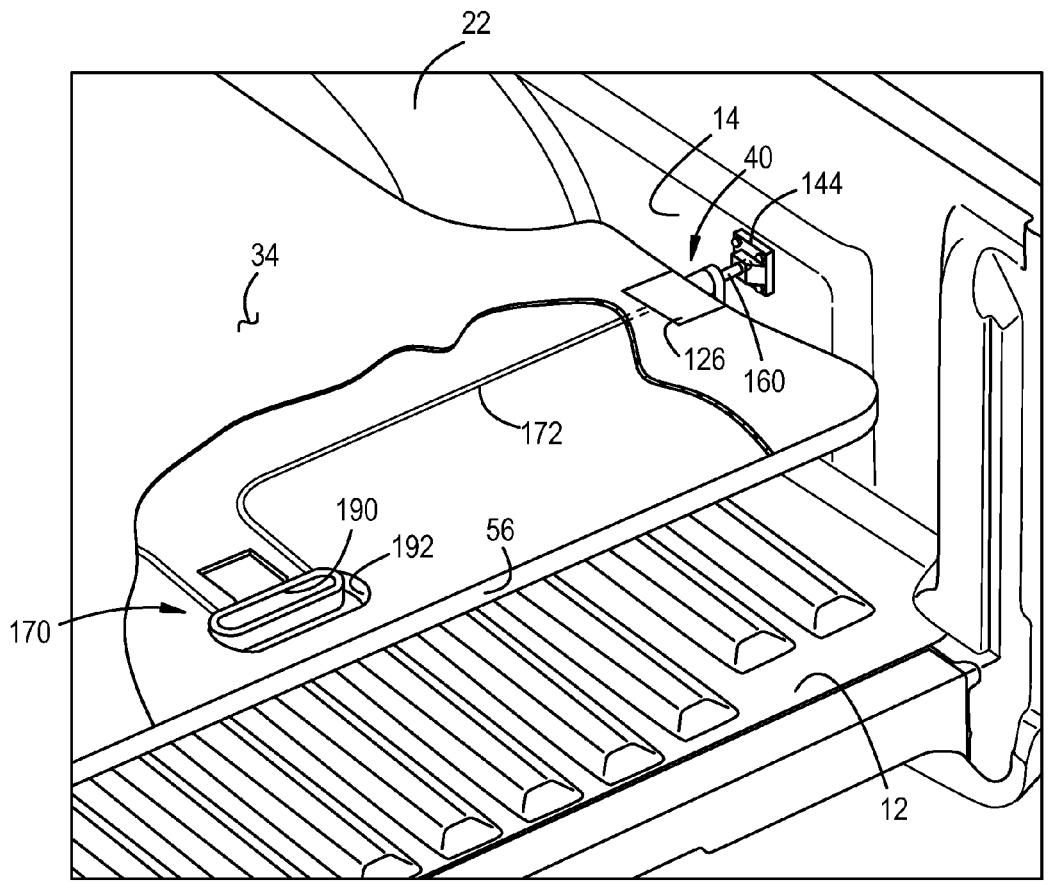
FIG. 6 is a view similar to FIG. 2 but showing a handle for remotely releasing a latch mechanism.

As seen in FIGS. 3, 5, and 6, a striker 144 is mounted on the sidewall 14 a few inches above the retainer assembly 78. The striker 144 is preferably of diecast metal and is mounted on the sidewall 14 by bolts 148 and 150. The striker 144 has a striker hole 152, a ramp 154, and an abutment 156 as will be discussed further hereinafter.

Referring again to FIG. 3, latch hub 72 has a bore 158 in which a latch pin 160 is slidable. The latch pin 160 is spring-loaded in the rightward direction of FIG. 3 by a coil compression spring 162 housed within a spring cavity 164 of the latch hub 72. The latch pin 160 is spring-loaded to an extended position in which a latch end 166 of the latch pin 160 is seated within the hole 152 of striker 144, thereby latching the hub 72 and panel 34 to the sidewall 14 of the vehicle so that the panel 34 will be latched at its raised position of FIG. 2.

A release mechanism, generally indicated at 170, is provided for withdrawing the latch pin 160 from the striker 144 so that the vehicle user can then swing the panel 34 downwardly from its raised position of FIG. 2 to its lowered position of FIG. 1. As seen in FIGS. 3 and 6, a cable assembly 172 is routed through the interior of the panel 34 between a handle 174 and the latch pin 160. As seen in FIG. 3 the cable assembly 172 includes an outer sheath 178, and a cable or wire 180 that slides within the outer sheath 178. One end of the outer sheath 178 is fixedly mounted on upper and lower mounting plates 126 and 128. The end of the wire 180 carries a retainer 184 that is captured within a retainer cap 186 threaded onto the end of the latch pin 160. The other end of the outer sheath 178 is fixedly mounted on the panel 34 adjacent the handle 174. The handle 174 is slidably mounted in a handle opening 192 provided in the panel 34 adjacent the rear edge 56. Wire 176 of the cable assembly 172 is suitably attached to the handle 174. Accordingly, when the vehicle user pulls the handle 190 rearwardly, the wire 180 will pull and retract the latch pin 160 leftwardly, thereby removing the latch end 166 of the latch pin 160 from its engagement within the striker hole 152 of the striker 144. With the latch unlatched in this manner, the vehicle user can swing the panel 34 from its raised position of FIG. 2 to the lowered position of FIG. 1.

The vehicle user can restore the panel 34 to its raised position by once again swinging the panel 34 rearwardly and upwardly as enabled by the four swing arm assemblies 40, 42, 44, 46 provided at the four corners of the panel 34. As seen in FIG. 5, as the panel 34 approaches its fully raised position, the latch pin 160, shown in phantom-line, will engage against ramp 154, thereby forcing a leftward retraction of the latch pin 160 until the pin 160 can be inserted into the latch hole 152 of the striker 144 by the spring load of the spring 162.

Although the drawings show a successful embodiment of the invention, a person of ordinary skill will see that many modifications may be made within the scope of our invention. For example, although four of the swing arm assemblies are shown, one at each corner of the panel 34, additional swing arm assemblies can be provided if desired. Although the drawings show striker 144 mounted at only the rear corners of the panel 34 it will be understood that additional strikers and latch pins can be provided at the forward corners if additional latching is desired. In addition strikers 144 can be provided on the side walls 14 and 16 near the floor 12 in order to latch the swing arms at their lowered positions as well as the raised positions. In addition, we show a push-pull cable for releasing the latch assemblies, but other operating linkages known in the prior art can be substituted therefore.

Thus, it is seen that the auxiliary bed floor apparatus 32 is provided for the bed of a pickup truck or sport utility vehicle so that oversized sheets of construction material can be conveniently laid flat for transport. Furthermore, as seen in FIG. 2, it will also be appreciated that the auxiliary bed floor apparatus 32 of this invention has the advantage of creating a two-tier storage system for the cargo box 10, in which a first layer of tools or materials can be rested on the vehicle floor 12 and concealed beneath the panel 34, while a second layer of tools or materials can be rested on top of the panel 34.

What is claimed is:

1. An auxiliary bed floor for carrying sheet materials in a vehicle having sidewalls on each side of a floor and wheel housings that rise from the floor to a height less than the height of the sidewalls and project inward from the sidewalls, comprising:

a panel;

and a plurality of swing arms, each of the swing arms having a first end pivoted on a sidewall above the floor, and a second end pivoted on the panel so that swinging of the swing arms will swing the panel between a lowered position in which the panel is adjacent the floor and a raised position in which the panel is positioned above the height of the wheel housings so that sheet materials can be carried in the space between the sidewalls and above the wheel housings.

2. The auxiliary bed floor of claim 1 further comprising the panel being constructed of rigid foam sandwiched between upper and lower plastic sheets.

3. The auxiliary bed floor of claim 1 further comprising the panel having four corners and a swing arm being provided at or adjacent to each of the four corners.

4. The auxiliary bed floor of claim 1 further comprising a latch mechanism associated with the second end of at least one of the swing arms for latching the swing arm to the sidewall of the vehicle in at least in the raised position of the panel.

5. The auxiliary bed floor of claim 1 further comprising a latch mechanism associated with the second end of at least one of the swing arms for latching the swing arm to the sidewall of the vehicle in each of the raised position and the lowered position.

6. The auxiliary bed floor of claim 1 further comprising a swing arm provided on each side of the panel adjacent a rear end of the panel, and the swing arms each having a latch mechanism associated therewith for latching engagement with the adjacent sidewall of the vehicle.

7. The auxiliary bed floor of claim 4 further comprising the latch mechanism including a spring-loaded plunger mounted on the swing arm and a striker mounted on the sidewall of the vehicle.

8. The auxiliary bed floor of claim 7 further characterized by a latch operating handle mounted on the panel and connected to the spring-loaded plunger for selectively withdrawing the plunger against the spring load to disengage the plunger from the striker and thereby enable pivoting movement of the swing arms to lower the panel from the raised position to the lowered position.

9. The auxiliary bed floor of claim 1 further comprising the first end of each of the swing arms having a spring-loaded pivot pin that normally extends into a retainer mounted on the sidewall to support the swing arm for pivoting movement, said spring-loaded pivot pin being retractable against the spring load to disengage the pivot pin from the retainer mounted on the sidewall, thereby enabling removal of the panel and swing arms from the vehicle.

10. The auxiliary bed floor of claim 1 having side edges and front and rear edges, the side edges defining a width of the panel that is less that the width of floor space between the sidewalls and greater than the width of floor space between the wheel housings, said panel having cutouts along the side edges to remove portions of the panel that would interfere with the wheel housings upon movement of the panel between the raised and lowered positions.

11. An auxiliary bed floor for carrying sheet materials in a vehicle having sidewalls on each side of a floor and wheel housings that rise from the floor to a height less than the height of the sidewalls and project inward from the sidewalls comprising:
a panel having side edges and front and rear edges, the side edges defining a width of the panel that fits between the sidewalls, and said side edges having cutouts to remove portions of the panel that would interfere with the wheel housings;
and a plurality of swing arms, each having a first end pivoted on a sidewall above the floor, and a second end pivoted on the panel so that swinging of the swing arms will swing the panel between a lowered position in which the panel is adjacent the floor and a raised position in which the panel is positioned above the height of the wheel housings so that sheet materials can be carried in the space between the sidewalls and above the wheel housings.

12. The auxiliary bed floor of claim 11 further comprising a latch mechanism associated with the second end of at least one of the swing arms for latching the swing arm to the sidewall of the vehicle in at least the raised position of the panel.

13. The auxiliary bed floor of claim 11 further comprising a latch mechanism associated with the second end of at least one of the swing arms for latching the swing arm to the sidewall of the vehicle in each of the raised position and the lowered position.

14. The auxiliary bed floor of claim 12 further comprising the latch mechanism including a spring-loaded plunger mounted on the swing arm and a striker mounted on the sidewall of the vehicle, and a handle mounted on the panel and connected to the spring-loaded plunger for selectively withdrawing the plunger against the spring load to disengage the plunger from the striker and thereby enable pivoting movement of the swing arms to lower the panel from the raised position to the lowered position.

15. The auxiliary bed floor of claim 11 further comprising the first end of each of the swing arms having a spring-loaded pivot pin that normally extends into a retainer mounted on the sidewall to support the swing arm for pivoting movement, said spring-loaded pivot pin being retractable against the spring load to disengage the pivot pin from the retainer mounted on the sidewall, thereby enabling removal of the panel and swing arms from the vehicle.

16. An auxiliary bed floor for carrying sheet materials in a vehicle having sidewalls on each side of a floor and wheel housings that rise from the floor to a height less than the height of the sidewalls and project inward from the sidewalls, comprising:
a panel;
a plurality of swing arms, each having a first end pivoted on a sidewall above the floor, and a second end pivoted on the panel so that swinging of the swing arms will swing the panel between a lowered position in which the panel is adjacent the floor and a raised position in which the panel is positioned above the height of the wheel housings so that sheet materials can be carried in the space between the sidewalls and above the wheel housings;
and a latch mechanism associated with the second end of at least one of the swing arms for latching the swing arm to the sidewall of the vehicle in at least in the raised position of the panel.

17. The auxiliary bed floor of claim 16 further comprising said latch mechanism including a spring-loaded plunger mounted on the swing arm and a striker mounted on the sidewall of the vehicle, and a latch operating handle mounted on the panel and connected to the spring-loaded plunger for selectively withdrawing the plunger against the spring load to disengage the plunger from the striker and thereby enable pivoting movement of the swing arms to lower the panel from the raised position to the lowered position.

18. The auxiliary bed floor of claim 16 further comprising the first end of each of the swing arms having a spring-loaded pivot pin that normally extends into a retainer mounted on the sidewall to support the swing arm for pivoting movement, said spring-loaded pivot pin being retractable against the spring load to disengage the pivot pin from the retainer mounted on the sidewall, thereby enabling removal of the panel and swing arms from the vehicle.

19. The auxiliary bed floor of claim 16 further comprising;

the first end of each of the swing arms having a spring-loaded pivot pin that normally extends into a retainer mounted on the sidewall to support the swing arm for pivoting movement, said spring-loaded pivot pin being retractable against the spring load to disengage the pivot pin from the retainer mounted on the sidewall, thereby enabling removal of the panel and swing arms from the vehicle, and said latch mechanism including a spring-loaded plunger mounted on the swing arm and a striker mounted on the sidewall of the vehicle, and a latch operating handle mounted on the panel and connected to the spring-loaded plunger for selectively withdrawing the plunger against the spring load to disengage the plunger from the striker and thereby enable pivoting movement of the pivot arms to lower the panel from the raised position to the lowered position.

20. The auxiliary bed floor of claim 19 having side edges and front and rear edges, the side edges defining a width of the panel that is less that the distance between the sidewalls and greater than the distance between the wheel housings, said panel having cutouts along the side edges to remove portions of the panel that would interfere with the wheel housings upon movement of the panel between the raised and lowered positions.

* * * * *